124,557

UNITED STATES PATENT OFFICE.

JOSIAH S. ELLIOTT, OF CHELSEA, AND JOHN F. WOOD, OF EVERETT, MASS.

IMPROVEMENT IN THE MANUFACTURE OF IMITATION MARBLE.

Specification forming part of Letters Patent No. 124,557, dated March 12, 1872.

SPECIFICATION.

*To all whom it may concern:*

Be it known that we, JOSIAH S. ELLIOTT, of Chelsea, in the State of Massachusetts, and JOHN F. WOOD, of Everett, in said State, have invented an Improved Imitation of Marble; and we do hereby declare the following to be a full and correct description of the same.

Imitations of marble made from various cheap stones, more especially from slate, have long been in use, generally under the name of Penrhyn marbles. Such marbles, or imitations of marble, have been prepared by an application of paint to the surface of the natural stone.

The object of this invention is to make an imitation of marble from artificial stone. By the invention there is saved the difference between the cost of molding artificial stone to form and the cost of cutting to the required form the natural stone used for the Penrhyn marbles.

Most artificial stones, however, cannot be marbled. In most of them the material from which they are made is of such a coarse nature that the surface of the stone can never be made sufficiently smooth to be marbled. We have found great difficulty in selecting a suitable material to be mixed with the cements. It must be reducible to a fine soft powder, which, when united with the cement, will form a stone of great strength, capable of taking a smooth surface and of holding always sharp edges or angles. Stones which are smooth and take a polish in their natural state, and may be reduced to a soft powder, will best answer; and of these natural marble, slates, and soap-stones give the most favorable results. Yet artificial stone made from marble is liable to check, that from soap-stone has hardly sufficient strength, and that from slate will not always hold its edge. We find that the best artificial stones for this purpose can be made by mixing powders reduced from several stones, each stone imparting its peculiar characteristic to the combination. And we have obtained the best results by the use of a combination consisting of about twenty parts of soap-stone, about fifteen parts of natural marble, and about fifty parts of a ferruginous sandstone found in Orange county, in Vermont, and in Baldwinsville, in New York.

Following the instructions set forth in the several Letters Patent of the United States granted Stanislas Sorel for improvements in the manufacture of artificial stone and cements for the same—viz., Letters Patent No. 53,092, dated March 6, 1866; Letters Patent No. 100,944, dated March 15, 1870; and Letters Patent No. 100,945, dated March 15, 1870—we use oxide of magnesium as a base, and mix with it, in a dry state, a powder of the kind described above, substantially in the manner indicated in the first of the above-named patents, and afterward moisten the mixture, as in said patent directed, with chloride of magnesium, or with any of the equivalents thereof, as set forth in the last of the above-named patents.

Or, the oxide and chloride of zinc may be substituted for the oxide and chloride of magnesium in the manufacture; in which case we mix and incorporate with the above-described powder, in a dry state, from about ten to about twenty per cent. in weight of the oxide of zinc, and moisten the mixture with chloride of zinc until it will hold the shape given it by compressing in the hand.

In whichever way prepared, the moistened mixture is then molded to the required form by direct pressure or tamping. After a short time it will sufficiently harden without the application of heat. The molded stone is then rubbed and polished upon the surface to be marbled until the surface is perfectly smooth, when a coating of paint is applied with an ordinary brush, and the stone is heated in an oven to a temperature of from 100° to 200°, more or less. This coating of paint gives what may be termed the ground-color. Veins are applied, after the stone has received its first coat of paint, by the ordinary water-marbling process. After receiving the veins the stone is again heated to the temperature before indicated. It is then rubbed smooth and a coat of varnish applied, when it is heated as before, and afterward finished by polishing.

We do not wish, however, to be understood that our invention relates so much to the use of the particular materials above specified as it does to the production of an artificial stone which shall possess the qualities which we have described and shall fit it for the uses for which it is designed. The pigments used are the same as those used in marbling natural stone; but it is decidedly preferable that oil should be used, in part, in the preparation of the paint, while in marbling natural stone spirit paint alone is used.

We claim—

An artificial stone with a marbled surface, substantially as described.

The above specification of our said invention signed and witnessed at Boston this 2d day of February, A. D. 1872.

J. S. ELLIOTT.
      JN. F. WOOD.

Witnesses:
 WILLIAM W. SWAN,
 H. FARNAM SMITH.